(12) United States Patent
Yordanov et al.

(10) Patent No.: US 8,082,508 B2
(45) Date of Patent: Dec. 20, 2011

(54) METHOD AND SYSTEM FOR OBTAINING AND MODIFYING PORTLETS VIA AN APPLICATION PROGRAMMING INTERFACE

(75) Inventors: Diyan A. Yordanov, Sofia (BG); Vera D. Buchkova, Sofia (BG); Claude Rossi, Valbonne (FR)

(73) Assignee: SAP AG, Walldorf (DE)

( * ) Notice: Subject to any disclaimer, the term of this patent is extended or adjusted under 35 U.S.C. 154(b) by 649 days.

(21) Appl. No.: 12/112,881

(22) Filed: Apr. 30, 2008

(65) Prior Publication Data
US 2008/0270924 A1 Oct. 30, 2008

Related U.S. Application Data

(60) Provisional application No. 60/926,989, filed on Apr. 30, 2007.

(51) Int. Cl.
*G06F 3/00* (2006.01)
(52) U.S. Cl. .......................... 715/742; 715/743
(58) Field of Classification Search .................. 715/742, 715/743, 744
See application file for complete search history.

(56) References Cited

U.S. PATENT DOCUMENTS

| | | | |
|---|---|---|---|
| 2002/0169852 A1* | 11/2002 | Schaeck | 709/218 |
| 2006/0235942 A1* | 10/2006 | Gale et al. | 709/217 |
| 2006/0277199 A1* | 12/2006 | Joret et al. | 707/10 |
| 2007/0124688 A1* | 5/2007 | Nauerz et al. | 715/746 |
| 2007/0240063 A1* | 10/2007 | Cheng et al. | 715/741 |
| 2007/0294371 A1* | 12/2007 | Petri | 709/219 |

* cited by examiner

*Primary Examiner* — Omar Abdul-Ali

(57) ABSTRACT

A method and a system for obtaining and modifying a plurality of Web components, such as portlets, via an application programming interface (API) are described. The method includes permitting a portal application to invoke a portlet, wherein the portlet runs inside a portlet container and the portal application runs independently from the portlet container; providing information to the portlet container about the invoked portlet related to a runtime environment of the portal application; and modifying the provided information from the portal application to customize the portlet. The system includes a portal application, a portlet container to permit the portal application to invoke a portlet, the portlet to run inside the portlet container and the portal application to run independently from the portlet container, an interface to provide and modify information about the invoked portlet that is related to a runtime environment of the portal application, and an interface to provide a portlet mode, a window state, and a set of Uniform Resource Locator (URL) parameters to the portal application to create a valid portlet URL.

14 Claims, 4 Drawing Sheets

METHOD AND SYSTEM FOR OBTAINING AND MODIFYING PORTLETS VIA AN APPLICATION PROGRAMMING INTERFACE

CROSS REFERENCE TO RELATED APPLICATION

This application claims the priority of U.S. Provisional Patent Application Ser. No. 60/926,989 entitled "Web Container et al." and filed on Apr. 30, 2007.

BACKGROUND

1. Field of Invention

Embodiments of the invention relate generally to the software arts, and, more specifically, to a method and a system for obtaining and modifying Web components such as portlets.

2. Background

Many organizations implement an enterprise portal to host internal and external applications. A portal is an application which aggregates portlet applications together in a presentable format. Beyond merely being a presentation layer, a portal typically allows users to customize their presentation, including what portlet applications to display. A portal can also provide a convenient single sign-on mechanism for users. Single sign-on allows access to all applications once a user logs into a portal, that is the user does not have to log into every application separately.

A portlet is an individual Web component that is made accessible to users via a portal application. Typically, a single portlet generates only a fragment of the markup that a user sees from a browser. Users issue requests against portlets from a portal page. The portal in turn forwards those requests to a portlet container, which manages the lifecycle of a portlet. The portlet container is part of the portal application. The portlet container provides the run-time environment to portlets, much in the same way a servlet container provides the environment for servlets. The portlet container manages portlets by invoking their lifecycle methods. The portlet container forwards requests to the appropriate portlet. When a portlet generates a response, the portal renders it to the user. The sequence of events results in the user's portal page.

Portlets and servlets have a number of similarities. A servlet is an object that receives a request and generates a response based on that request. Portlets are similar to servlets, in that: 1) portlets are managed by a specialized portlet container; 2) portlets generate dynamic content; 3) a portlet's life cycle is managed by the portlet container; and 4) portlets interact with a client device via a request/response paradigm. Portlets are different from servlets, in that: 1) portlets only generate markup fragments, not complete documents; 2) portlets are not directly Uniform Resource Locator (URL) addressable; and 3) portlets cannot generate arbitrary content, since the content generated by a portlet is going to be part of portal page.

Portlets also have access to additional functionality such as: 1) portlets ways to access and store persistent configuration and customization data; 2) portlets have access to user profile information; 3) portlets have URL rewriting functions for creating hyperlinks within their content, thus allowing the portal server agnostic creation of links and actions in page fragments; and 4) portlets can store transient data in the portlet session in two different scopes: the application-wide scope and the portlet private scope.

However, portlets do not have access to the following functionality provided by servlets: 1) setting the character set encoding of the response; 2) setting Hypertext Transfer Protocol (HTTP) headers on the response; and 3) the URL of the client request to the portal.

A portlet container is very similar to a servlet container, in that every portlet is deployed inside a portlet container that controls the life cycle of the portlet and provides it with necessary resources and information about its environment. A portlet container is responsible for initializing and destroying portlets and also for passing user requests to the portlet and collecting responses from the portlet. The portlet container also provides persistent storage for portlet preferences.

SUMMARY OF THE INVENTION

A method and system for obtaining and modifying a plurality of Web components, such as portlets, via an application programming interface (API). The method includes permitting a portal application to invoke a portlet, wherein the portlet runs inside a portlet container and the portal application runs independently from the portlet container; providing information to the portlet container about the invoked portlet related to a runtime environment of the portal application; and modifying the provided information from the portal application to customize the portlet.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of the invention relate to obtaining and modifying a plurality of Web components such as portlets, from a portal application via an application programming interface (API). The portlets' lifecycle is managed by a portlet container, wherein the portlet container runs independently from the portal application. The portlet container sits between the portal application and the portlets. Thus, a portal application invokes and administers portlets from the portlet container using an API. Having the portlet container running independently from the portal application, enables different portal applications (remote or local and from different vendors as well) to invoke the deployed and available portlets managed by the portlet container using the API. The API provides easy integration between a portal application and a portlet container. The API allows portal applications to invoke a portlet and retrieve information about portlets and expose it to the portal application. The portlet container forwards user requests to the appropriate portlet. When a portlet generates a response, the portlet container sends it to the portal to be rendered to the user. The sequence of events results in the user's portal page. It should be noted that in this document the words "portal" and "portal application" have identical meaning.

Portlets are developed as any other Web component in a development environment such as the SAP NetWeaver Developer Studio. During development process of the portlets, one or more portlets are packed in a portlet module. The portlet module includes a number of elements, for example, the portlets as Java classes and a portlet deployment descriptor, a document in an eXtensible Markup Language (XML) format that describes the portlet. The portlet module may be packaged as a Web archive file (WAR). A plurality of portlet modules may be included in one portlet application. Thus, the portlet application provides the functions and business logic of all portlets contained within the portlet application.

Figure 1:
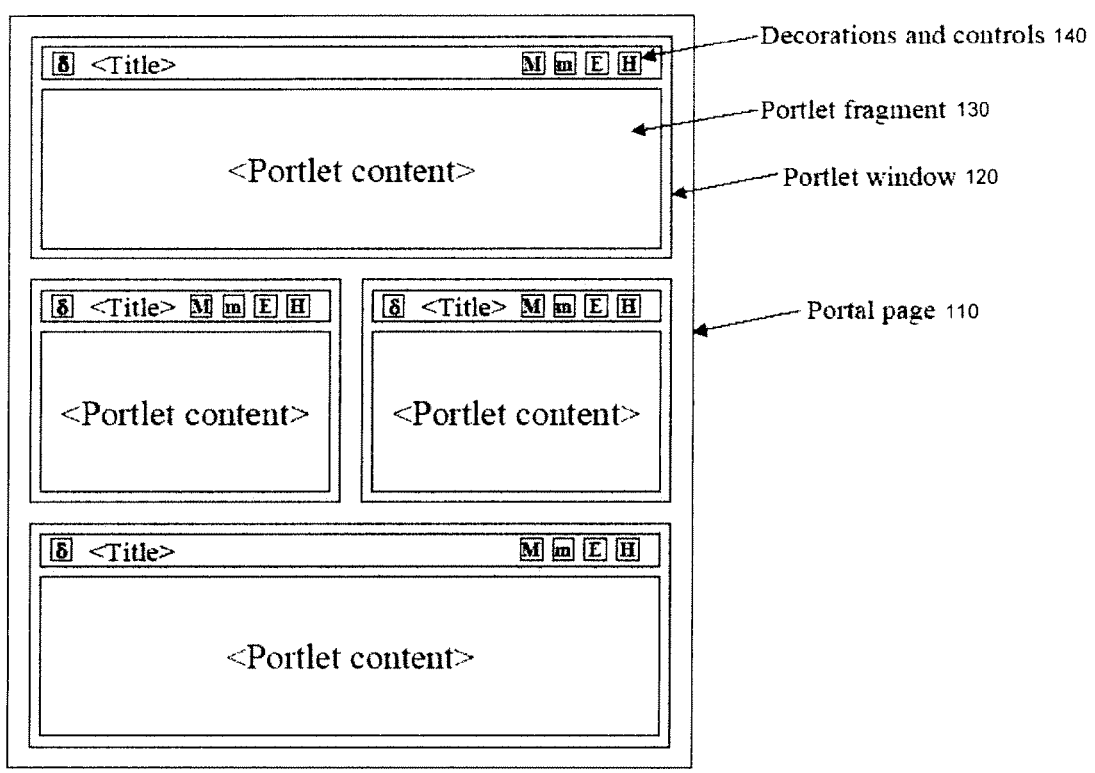
FIG. 1 is a block diagram of an embodiment of a portal page.

FIG. 1 is a block diagram of an embodiment of a portal page. Portal page 110 is built up of one or more portlet windows 120. Every portlet window 120 includes two parts: decorations and control part 140 and portlet fragment part 130. Decorations and control part 140 decides how the title bar, controls, and borders of portlet windows appear. The portlet fragment 130 is contributed by a portlet application. The server on which a portal application is running decides the overall look and feel of the portal page, such as the logo, the colors of the title bars, the images for the controls, etc. By changing a few standard files, the complete look and feel of the portal application can be changed. The portal page shows the results of the user requests from the portal application.

Figure 2:
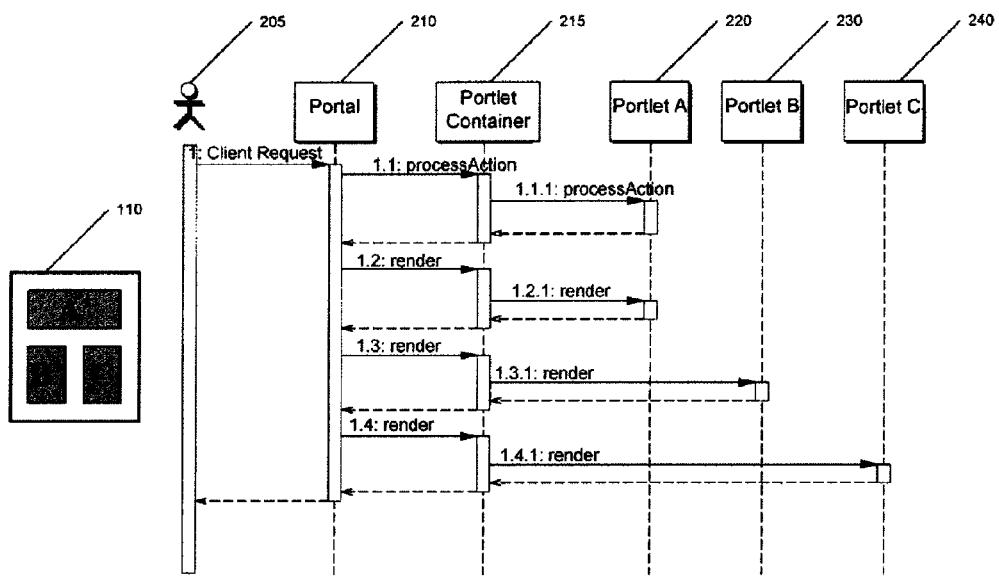
FIG. 2 is a sequence diagram of an embodiment for creating a portal page.

FIG. 2 is a sequence diagram of an embodiment for creating a portal page. FIG. 2 shows how content from separate portlets is assembled by a portal container to create portal page 110. User 205 sends a request that requires several portlets to be rendered. The request can be sent via a client device, such as a Web browser. The user request is received at portal 210. Most portals are basically portal applications deployed on an application server, using a servlet for handling requests to the portal server. A servlet is an object that receives a request and generates a response based on that request. Portal 210 determines the set of portlets that need to be executed to fulfill the request. Portal 210 through portlet container 215 invokes the portlets. Portlet container 215 maintains all portlets available and runs independently from portal 210. Portlet container 215 invokes portlet A 220, portlet B 230, and portlet C 240. The portlet container 215 receives content generated by the portlets A, B, and C. The portal 210 creates the portal page 110 by aggregating content generated by the portlets A, B, and C. Portal 210 sends the created page 110 to the client (e.g., Web browser), where it is presented to the user 205.

Figure 3:
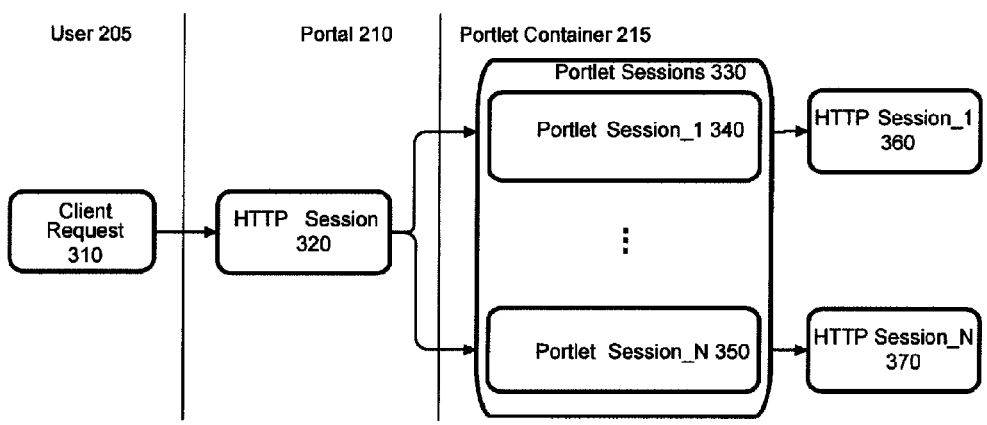
FIG. 3 is a block diagram of an embodiment of the invention for handling portlet sessions.

FIG. 3 is a block diagram of an embodiment of the invention for handling portlet sessions. In computer science, a "session" is either a lasting connection using the session layer of a network protocol or a lasting connection between a user and a peer, typically a server. When a request is sent from a user to a server via a network protocol, a session is established. The network protocol may be Hypertext Transferring Protocol (HTTP) and the session—an HTTP session. The HTTP session stores session-specific data. When a portlet is invoked, a portlet session is established that stores data for the portlet. The session associates the client with the request to the portlet.

In one embodiment, user 205 sends a client request 310 to portal 210 that requires portal page 110 to be generated. An HTTP session 320 is established between the user 205 and the portal 210. The portal 210 has to obtain portlets from a plurality of portlet applications and to aggregate their content to generate portal page 110. Therefore, the request is forwarded to portlet container 215, which manages the portlet applications. Portlet sessions 330 are created for every portlet application that needs to be invoked. Each portlet session, from portlet session_1 340 to portlet session_N 350, refers to an HTTP session that is specific to the portlet application and this portlet session. For example, portlet session_1 340 refers to HTTP session_1 360 and so on to portlet session_N 350, which refers to HTTP session_N 370.

These HTTP sessions differ from the initial HTTP session established between the user 205 and the portal 210. Thus, the different portlet applications do not share the same HTTP session. However, portlets, servlets, and JavaServer Pages (JSPs) within the same portlet application, share the same HTTP session. For portlets that reside within one and the same portlet application, every portlet request is generated as a result of a group of requests originating from the portal application to complete a single client request and acquires the same portlet session. The portlet session stores all attributes in the HTTP session of the portlet application. All user attributes set in the portlet session are visible in the HTTP session of the portlet application and vice versa. When a portlet invalidates a portlet session, the HTTP session also gets invalidated and vice versa. In addition, creating a new portlet session results in creating a new HTTP session on which the portlet session is based.

Figure 4:
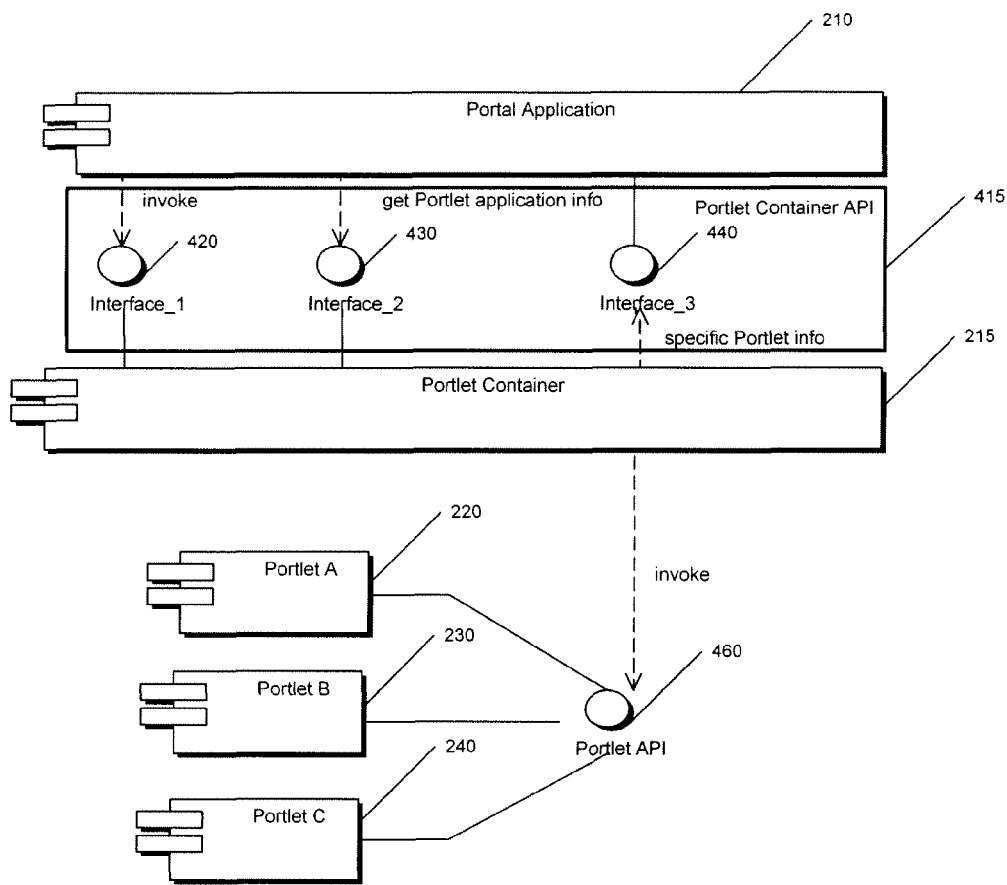
FIG. 4 is a block diagram of an embodiment for invoking a portlet from a portal application via an API.

FIG. 4 is a block diagram of an embodiment for invoking a portlet from a portal application via an API. A portal 210 is running on an application server. When a request is received at the application server and the request requires a portal page to be generated, a plurality of portlets must be obtained. These portlets are invoked by portlet container 215 via an application programming interface. The portal 210 invokes a number of interfaces from a portlet container application programming interface (API) 415. Portlet container API 415 includes interface_1 420, interface_2 430, and interface_3 440. The portlet container 215 is invoked via the portlet container API 415. Portlet container 215 invokes portlet API 460. Via portlet API 460, the portlet container 215 invokes portlet A 220, portlet B 230, and portlet C 240. Portlets A, B, and C are maintained by the portlet container 215. Using the portlet container API 415, portal application 210 obtains and modifies the portlets maintained by the portlet container 215.

Figure 5:
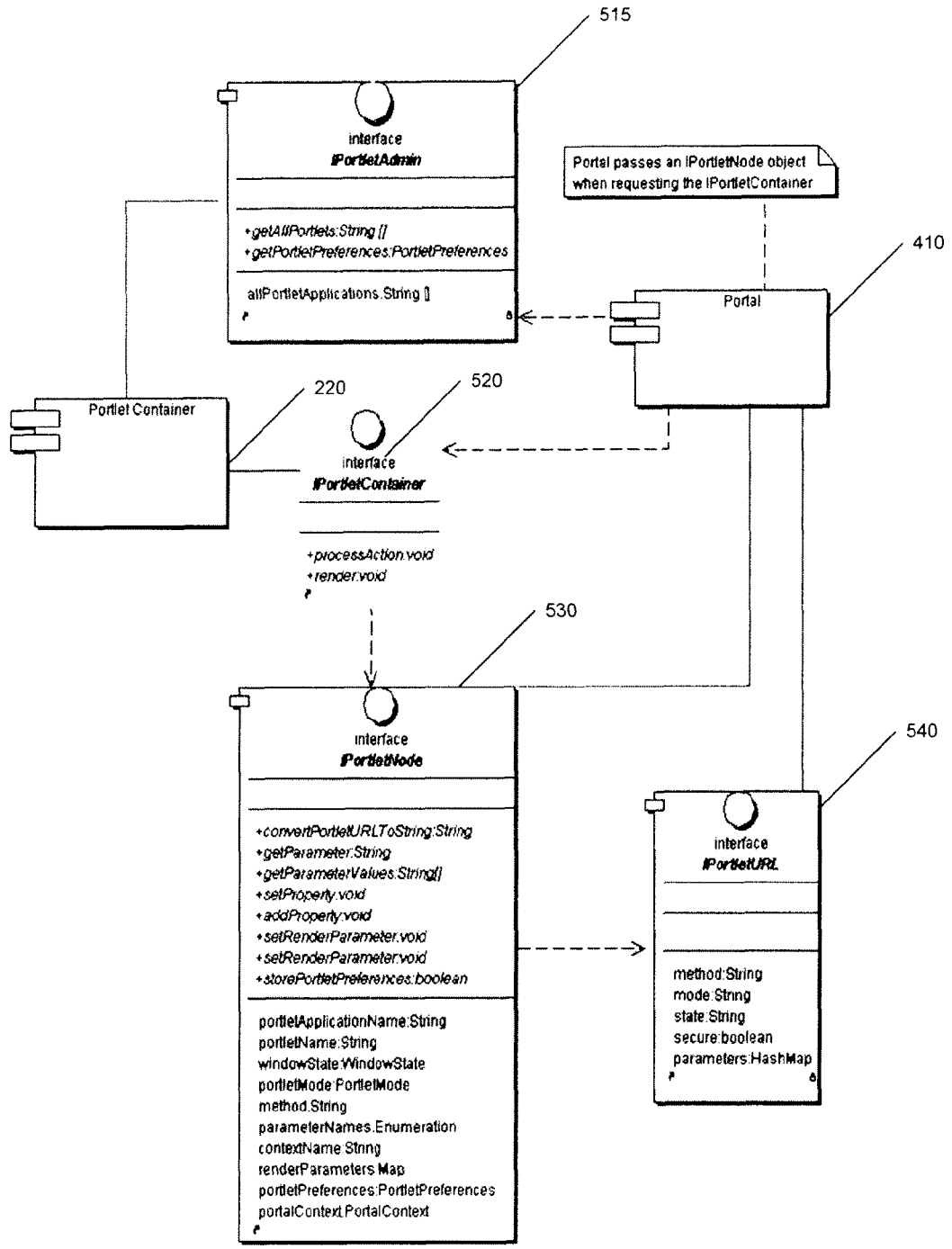
FIG. 5 is a block diagram of an embodiment that shows the API for invoking and modifying portlets from a portal application.

FIG. 5 is a block diagram of an embodiment that shows the API to invoke and modify portlets from a portal application. Using portlet container API 415, portal application 210 obtains portlets and information about the portlets from portlet container 215. The API enables modifying the provided information from the portal application to customize a portlet. Portal application 210 uses IPortletContainer interface 520 to invoke portlets such as portlet A 220, portlet B 230, and portlet C 240. The portlets are invoked by the portal 210 via portlet container 215. The IPortletContainer interface 520 is implemented by the portlet container 220. The IPortletContainer interface 520 includes two methods: "processAction( )" and "render( )". The "processAction( )" method is called by the portal 210 in response to a user action such as clicking a hyperlink or submitting a form; in this method, the portlet container 215 prepares request and response objects, initializes the runtime environment to invoke the "processAction" method of the target portlet. The "render( )" method is called by the portal 215 to get the content generated by a portlet that is part of the portal page; this method has to be called by the portal to invoke the render method of the targeted portlet. The "render( )" method follows "processAction( )" in the chain of portlet request lifecycle methods.

Portal application 210 manages the order of invocation of action requests and renders requests of the portlets in portal page 110. Portal application 210 invokes the render requests after the action request is completed. Both methods receive request and response objects as parameters. When the "render( )" method of IPortletContainer interface 520 is invoked, the portlet container 215 prepares render request and response objects, sets render request parameters, initializes the runtime environment, and invokes the "render( )" method of the targeted portlet. There is a third parameter for these methods: an object of IPortletNode interface 530. IPortletNode interface 530 represents the portlet that is the target of "processAction( )" and "render( )" methods. The IPortletNode object provides additional information for an invoked portlet related to portal application 210 runtime environment.

IPortletNode interface 530 includes at least a subset of the following methods: "getPortletApplicationName( )", "getPortletName( )", "getWindowState( )", "setWindowState( )", "isWindowStateAllowed( )", "getPortletMode( )", "setPortletMode( )", "isPortletModeAllowed( )", "convertPortletURLToString( )", "getParameter( )", "getParameterValues( )", "getParameterNames( )", "getContextName( )", "setProperty( )", "addProperty( )", "setRenderParameters( )", "getPortletPreferences( )", "getUser", "setPortletTitle", "getPortalContext( )", "setPortletTitle( )", "setExpirationCache( )", and "getMethod( )". Set as used herein is deemed to have a positive integer number of members; subset is also deemed to have a positive integer number of members.

The "getPortletApplicationName( )" method returns the name of the portlet application to which the portlet belongs. The "getPortletName( )" method returns the name of the portlet.

The "getWindowState( )" method returns the current window state of a portlet; a portlet's window state shows the amount of portal page space that will be assigned to the content generated by the portlet. There are three standard window states: Normal, Minimized, and Maximized. In some embodiments, more than three window states may exist. The "setWindowState( )" method sets the window state of a portlet to a particular window state—Normal, Minimized, and Maximized. Normal will display the portlet's data in the amount of window space defined by the portal application, Maximized will present only that portlet in the user's window, and Minimized may display a single line of text or nothing at all. The "isWindowStateAllowed( )" method checks whether the current user is allowed to switch the window state to a particular window state.

The "getPortletMode( )" method returns the current mode of a portlet. The "setPortletMode( )" method sets a particular mode to a portlet. The "isPortletModeAllowed( )" method checks whether the current user is allowed to switch to a particular mode; there are three portlet modes: view, edit, and help. In some embodiments of the invention, there can be more portlet modes.

The "convertPortletURLToString( )" method returns a string representation of a portlet's URL; the string representation of the portlet URL may not be a well formed URL but a special token instead, that is created at the time the portlet is generating its content. Portal servers often use a technique called URL rewriting that post-processes the content resolving tokens into real URLs.

The "getParameter( )" method returns a parameter included in the request of the current portlet. The "getParameterValues( )" method returns a value of a request parameter associated with the name of the parameter. The "getParameterNames( )" method returns an array of String objects containing the names of the parameters included in a request.

The "getContextName( )" method returns a unique identification name for a portlet (even if the same portlet is included twice in one portal page). The returned name must not contain a "?" character as it is used for encoding of portlet's attributes in the portlet session. The "setProperty( )" method sets a property for the subsequent render request; this property will be accessible to be returned to portal application 210. The "addProperty( )" method adds a value to an existing property for the subsequent render request and allows properties of response objects to have multiple values.

The "setRenderParameters( )" method sets render parameters to be used by the targeted portlet in the subsequent render request. The "getPortletPreferences( )" method retrieves user-specific preferences of a portlet, which are stored by portal application 210. The "getUser" method returns the user making the current request. The "setPortletTitle" method sets a preferred portlet title to be used by the portal application as a title-bar. The "getPortalContext( )" method returns the portal context. The "setExpirationCache( )" method sets an expiration timeout defined for this portlet. The "getMethod( )" returns the type of the portlet request, "Action" or "Render", with which the portlet is invoked.

Using IPortletContainer interface 520, portal application 210 invokes the portlets needed to generate portal page 110. Via the methods of IPortletNode interface 530, the portlet container obtains information about the portlet to be invoked. IPortletNode interface 530 is implemented by the portal application 210. Portal application 210 obtains additional information for the invoked portlets via IPortletAdmin interface 515 during administration of the portlets. IPortletAdmin interface 515 includes at least a subset of the following methods: "getVendors( )", "getPortletApplicationNames( )", "getPortletModuleNames( )", "getAllPortlets( )", "getPortletPreferences( )", "getExpirationCache( )", and "getSupportedModes( )".

The "getVendors( )" method returns a list of all vendor names of deployed applications that contain porlet modules. The portlet module includes a number of elements such as the portlets as Java classes and a deployment descriptor, a document in an XML format that describes the portlets. The "getPortletApplicationNames( )" method returns a list of all applications that contain portlet modules. The "getPortletModuleNames( )" method returns a list of all portlet Web modules that are within a particular portlet application.

The "getAllPortlets( )" method returns a list of all portlets within a particular portlet-web module. The "getPortletPreferences( )" method returns an object of the portlet's initial preferences loaded from the portal application. The "getExpirationCache( )" method returns the expiration cache timeout defined in the portlet deployment descriptor for the specified portlet. The "getSupportedModes( )" method returns a map containing Multi-Purpose Internet Mail Extensions (MIME) type String objects as keys and arrays of portlet modes as values, which the portlet has declared to support for the corresponding MIME-type, including the "view" mode.

The "convertPortletURLToString( )" method of IPortletNode interface 530 uses IPortletURL interface 540 as an input parameter. Thus, portal application 210 can obtain the mode and window state of a portlet and all parameters needed to create a URL for the portlet. This is necessary in case the portlet wants to obtain a String representation of portlet URL to include it in the portlet content. Portlet's mode determines what actions should be performed on a portlet and window state determines how much content should appear in the portlet. There are two types of portlet URLs: 1) action URLs that trigger an action request followed by a render request; and 2) render URLs that trigger a render request. Each portlet URL is targeted to a particular portlet. Therefore, based on the portlet URL type, two basic approaches can be used for the portal to invoke a portlet to handle a client request: 1) a client request triggered by an action URL, which results in one action request and many render requests; and 2) a client request triggered by a render URL which results in many render requests, one per portlet in a portal page.

The IPortletURL interface 540 includes at least a subset of the following methods: "getMethod", "getMode( )", "getState( )", "isSecure( )", and "getParameters".

The "getMethod" method returns the type of the portlet URL: action or render. The "getMode( )" method returns the portlet mode, in which the portlet should be if the portlet URL triggers a request. The "getState( )" method returns the window state in which the portlet should be if the portlet URL triggers a request. The "isSecure( )" method checks whether the portlet requests a secure connection between user 240 and the portlet window 120 for this URL. The "getParameters" method returns all parameters associated with a particular portlet URL.

Using the interfaces and methods of portlet container API 415, portal application 210 obtains and customizes portlets from portlet container 215.

Elements of embodiments may also be provided as a machine-readable medium for storing the machine-executable instructions. The machine-readable medium is an article of manufacture and may include, but is not limited to, flash memory, optical disks, CD-ROMs, DVD ROMs, RAMs, EPROMs, EEPROMs, magnetic or optical cards, or other type of machine-readable media suitable for storing electronic instructions. Some embodiments of the invention may be downloaded as a computer program, which may be transferred from a remote computer (e.g., a server) to a requesting computer (e.g., a client) by way of a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer implemented method comprising:
invoking a deployed portlet included in a portlet application by a server running a plurality of local portal applications, wherein the deployed portlet is running inside a portlet container and the plurality of local portal applications are running independently from the portlet container, further wherein the portlet application includes a portlet module that includes the deployed portlet and a set of elements including a portlet deployment descriptor and a class file of the deployed portlet;
providing information to the portlet container about the invoked deployed portlet related to a runtime environment of a portal application from the plurality of local portal applications, wherein the information includes a name of the portlet application to which the deployed portlet belongs and a set of rendering parameters to be used by the deployed portlet in a subsequent rendering request; and
modifying the provided information from the portal application to customize the deployed portlet.

2. The method of claim 1, wherein providing information about the invoked deployed portlet comprises:
providing at least a subset of: a name of the deployed portlet, a context name that uniquely identifies the deployed portlet when the deployed portlet is part of a portal page, and a set of user-specific preferences for the deployed portlet that are stored in a persistent storage unit accessible by the portal application.

3. The method of claim 1 further comprising:
creating a valid portlet action Uniform Resource Locator (URL) that triggers an action request and a render URL that triggers a render request, both based on a portlet mode, a window state, and a set of URL parameters provided to the portal application.

4. The method of claim 3, wherein modifying the provided information comprises:
specifying at least a subset of the window state, the portlet mode, a property of the deployed portlet, parameters related to rendering of the deployed portlet, and a title for the deployed portlet;
checking if a current user can switch to a subset of the deployed portlet mode and the window state, wherein the portlet mode is selected from a group consisting of a view mode, an edit mode, and a help mode, and wherein the window state defines window space for the deployed portlet; and
adding an additional property of the deployed portlet.

5. The method of claim 1, further comprising:
providing at least a subset of: a list of vendor names of a plurality of portlet applications that contain a first set of portlet modules, a list of portlet applications from a specific vendor that comprise a subset of the first set of portlet modules, a list of a second set of portlet modules that are within the portlet application, a list of portlets that are part of the second set of portlet modules, and portlet initial preferences loaded from the portlet deployment descriptor provided by the portlet application.

6. A computer system comprising:
a processor;
a memory in communication with the processor, the memory comprising:
a plurality of local portal applications running on a server;
a portlet container that enables the plurality of local portal applications to invoke a deployed portlet included in a portlet application, wherein the deployed portlet is running inside the portlet container and the plurality of local portal applications are running independently from the portlet container, and further wherein the portlet application includes a portlet module that includes the deployed portlet and a set of elements including a portlet deployment descriptor and a class file of the deployed portlet;
an interface to provide and modify information about the invoked deployed portlet that is related to a runtime environment of a portal application from the plurality of local portal applications, wherein the information includes a name of the portlet application to which the deployed portlet belongs and a set of render parameters to be used by the deployed portlet in a subsequent render request; and an interface to provide a portlet mode, a window state, and a set of Uniform Resource Locator (URL) parameters to the portal application to create a valid portlet URL.

7. The computer system of claim 6, wherein the interface to provide and modify information comprises:

at least a subset of a method to provide a name of the deployed portlet, a context name that uniquely identifies the deployed portlet when the deployed portlet is part of a portal page, and a method to provide a set of user-specific preferences for the deployed portlet that are stored in a persistent storage unit in the portal application.

8. The computer system of claim 6, wherein the interface to provide and modify information further comprises:

at least a subset of a method for specifying the window state and the portlet mode of the deployed portlet, a method for checking if a current user can switch to the specified portlet mode and the window state, a method for specifying and adding a property of the deployed portlet, a method for specifying parameters related to rendering of the deployed portlet, and a method for specifying a title for the deployed portlet to be used by the portal application.

9. The computer system of claim 6 further comprising:

at least a subset of a method for providing a list of vendor names of a plurality of portlet applications that contain a first set of portlet modules, a method for providing a list of portlet applications from a specific vendor that contain a subset of the first set of portlet modules, a method for providing a list of a second set of portlet modules that are within the portlet application, a method for providing a list of portlets that are part of the second set of portlet modules, and a method for providing portlet's initial preferences loaded from the portlet application.

10. A non-transitory machine-readable medium storing instructions therein that when executed by the machine cause the machine to:

invoke a deployed portlet included in a portlet application by a server running a plurality of local portal applications, wherein the deployed portlet is running inside a portlet container and the plurality of local portal applications are running independently from the portlet container, and further wherein the portlet application includes a portlet module that includes the portlet and a set of elements including a portlet deployment descriptor and a class file of the portlet;

provide information to the portlet container about the invoked deployed portlet related to a runtime environment of a portal application from the plurality of local portal applications, wherein the information includes a name of the portlet application to which the deployed portlet belongs and a set of rendering parameters to be used by the deployed portlet in a subsequent rendering request; and modify the provided information from the portal application to customize the deployed portlet.

11. The machine-readable medium of claim 10, wherein to provide information about the invoked portlet comprises:

providing at least a subset of: a name of the deployed portlet, a context name that uniquely identifies the deployed portlet, when the deployed portlet is part of a portal page, and a set of user-specific preferences for the deployed portlet that are stored in a persistent storage unit in the portal application.

12. The machine-readable medium of claim 10 having instructions that when executed further cause the machine to:

create a valid portlet action Uniform Resource Locator (URL) that triggers an action request and a render URL that triggers a render request, both based on a portlet mode, a window state, and a set of URL parameters provided to the portal application.

13. The machine-readable medium of claim 12, wherein to modify the provided information comprises:

specifying at least a subset of the window state, the portlet mode, a property of the deployed portlet, parameters related to rendering of the deployed portlet, and a title for the deployed portlet;

checking if a current user can switch to a subset of the portlet mode and the window state, wherein the portlet mode is selected from a group consisting a view mode, an edit mode, and help mode, and wherein the window state defines window space for the deployed portlet; and adding a property of the deployed portlet.

14. The machine readable medium of claim 10 having instructions that when executed further cause the machine to:

provide a subset of: a list of vendor names of a plurality of portlet applications that contain a first set of portlet modules, a list of portlet applications from a specific vendor that contain a subset of the first set of portlet modules, a list of a second set of portlet modules that are within the portlet application, a list of portlets that are part of the second set of portlet modules, and portlet initial preferences loaded from the portlet deployment descriptor provided by the portlet application.

* * * * *